United States Patent
Gen et al.

(10) Patent No.: US 9,427,111 B2
(45) Date of Patent: Aug. 30, 2016

(54) FOOD PROCESSING DEVICE WITH LID MOUNTED CONTROLS

(75) Inventors: Xu You Gen, Guangdong (CN); Huang Shen You, Hunan (CN)

(73) Assignee: Whirlpool Corporation, Benton Harbor, MI (US)

( * ) Notice: Subject to any disclaimer, the term of this patent is extended or adjusted under 35 U.S.C. 154(b) by 250 days.

(21) Appl. No.: 14/000,407

(22) PCT Filed: Feb. 25, 2011

(86) PCT No.: PCT/CN2011/000312
§ 371 (c)(1),
(2), (4) Date: Aug. 26, 2013

(87) PCT Pub. No.: WO2012/113107
PCT Pub. Date: Aug. 30, 2012

(65) Prior Publication Data
US 2014/0001296 A1    Jan. 2, 2014

(51) Int. Cl.
*A47J 43/07*    (2006.01)

(52) U.S. Cl.
CPC ......... *A47J 43/0716* (2013.01); *A47J 43/0777* (2013.01)

(58) Field of Classification Search
CPC ............... A47J 43/0722; A47J 43/046; A47J 43/0716; A47J 43/07; A47J 36/10; A47J 43/085; A47J 43/0772; A47J 27/004; A47J 43/04; A47J 43/0711; A47J 43/0727; A47J 45/065; A47J 19/02; A47J 19/06; A47J 42/46; A47J 42/50; A47J 43/0465; A47J 43/06; A47J 43/0766; A47J 43/0777; A47J 43/0794; A47J 43/1068

USPC ........ 241/36, 92, 282.1, 282.2; 99/337, 510, 99/511, 513
See application file for complete search history.

(56) References Cited

U.S. PATENT DOCUMENTS

| | | | |
|---|---|---|---|
| 2,189,199 A | 2/1940 | Criner | |
| 2,480,717 A | 8/1949 | Dodegge | |
| 3,199,860 A | 8/1965 | Moberg | |
| 3,623,525 A | 11/1971 | Kieves | |
| 3,704,736 A | 12/1972 | Pratley | |
| 3,784,118 A | 1/1974 | Hurwitz | |
| 4,113,188 A * | 9/1978 | Belinkoff | A47J 43/06 241/282.1 |

(Continued)

FOREIGN PATENT DOCUMENTS

| | | |
|---|---|---|
| CN | 1115128 C | 7/2003 |
| CN | 1575716 A | 2/2005 |

(Continued)

OTHER PUBLICATIONS

International Application No. PCT/CN201001487, filed Sep. 1, 2011, published as WO2012113125A1 on Aug. 30, 2012, Title "A Food Processing Device with an Externally Operated Adjustment Mechanism", Applicant: Whirlpool Corporation.

(Continued)

*Primary Examiner* — Shelley Self
*Assistant Examiner* — Peter Iannuzzi (57) ABSTRACT

A food processor includes a base and a bowl with a removable lid. Food items are advanced into the bowl through a feed tube formed in the lid where they are cut by a cutting assembly driven by a motor. The lid includes a user-operated button operable to control the motor.

12 Claims, 5 Drawing Sheets

(56) References Cited

U.S. PATENT DOCUMENTS

| | | |
|---|---|---|
| 4,190,208 A | 2/1980 | Schaeffer et al. |
| 4,213,569 A * | 7/1980 | Amiot ............... A47J 43/0761 241/282.1 |
| 4,369,680 A | 1/1983 | Williams |
| 4,560,111 A | 12/1985 | Cavalli |
| 4,570,519 A | 2/1986 | Motosko, II |
| 4,624,166 A | 11/1986 | Kreth et al. |
| 4,688,478 A | 8/1987 | Williams |
| 4,706,896 A | 11/1987 | Moon-Kau |
| 4,733,589 A | 3/1988 | Wolff |
| 4,818,116 A | 4/1989 | Pardo |
| 4,819,882 A | 4/1989 | Stottmann et al. |
| 4,877,191 A | 10/1989 | Golob et al. |
| 4,998,677 A | 3/1991 | Gallaher |
| 5,009,510 A | 4/1991 | Gabriele |
| 5,037,033 A | 8/1991 | Stottmann et al. |
| 5,046,252 A | 9/1991 | Ayuta et al. |
| 5,197,681 A | 3/1993 | Liebermann |
| 5,577,430 A | 11/1996 | Gunderson et al. |
| 6,254,019 B1 | 7/2001 | Galbreath |
| 6,315,226 B1 | 11/2001 | Trick et al. |
| 7,322,112 B2 | 1/2008 | Boemer |
| 7,328,864 B2 | 2/2008 | Narai et al. |
| 7,530,510 B2 * | 5/2009 | Newman ............... A47J 43/044 241/37.5 |
| 7,681,817 B2 | 3/2010 | Orent |
| 7,694,615 B2 | 4/2010 | DiPietro |
| D644,478 S | 9/2011 | Czach |
| D644,480 S | 9/2011 | Czach et al. |
| 2006/0075872 A1 | 4/2006 | Wangler |
| 2006/0150791 A1 | 7/2006 | Chase et al. |
| 2007/0044621 A1 | 3/2007 | Rote et al. |
| 2007/0209528 A1 | 9/2007 | Chang |
| 2007/0261523 A1 | 11/2007 | Hussey et al. |
| 2008/0115677 A1 | 5/2008 | Tseng |
| 2008/0156913 A1 | 7/2008 | Orent |
| 2008/0163768 A1 | 7/2008 | Glucksman et al. |
| 2008/0273420 A1 * | 11/2008 | Ferk ............... A47J 43/0716 366/206 |
| 2009/0139383 A1 | 6/2009 | Tsai |
| 2009/0158941 A1 | 6/2009 | Lee |
| 2009/0301319 A1 | 12/2009 | Bigge et al. |
| 2009/0314168 A1 | 12/2009 | Krasznai |
| 2011/0139017 A1 | 6/2011 | Berber et al. |
| 2011/0265664 A1 | 11/2011 | Goncalves et al. |

FOREIGN PATENT DOCUMENTS

| | | |
|---|---|---|
| CN | 1656989 A | 8/2005 |
| CN | 201101452 Y | 8/2008 |
| CN | 101496699 B | 12/2011 |
| DE | 2116675 A1 | 10/1971 |
| DE | 3644267 A1 | 7/1988 |
| DE | 202004012729 U1 | 2/2005 |
| EP | 010075 A2 | 2/1984 |
| EP | 0244016 A1 | 11/1987 |
| FR | 2500737 A1 | 9/1982 |
| FR | 2582497 | 12/1986 |
| FR | 2582497 A1 | 12/1986 |
| FR | 2602660 | 2/1988 |
| FR | 2646074 A1 | 10/1990 |
| FR | 2862199 A1 | 5/2005 |
| GB | 1264448 | 2/1972 |
| GB | 2075626 A | 11/1981 |
| JP | 1153123 A | 6/1989 |
| JP | 1299522 A | 12/1989 |
| JP | 4099551 A | 3/1992 |
| JP | 4099552 A | 3/1992 |
| KR | 200911969 U | 11/2009 |
| WO | 0019878 A1 | 4/2000 |
| WO | 0221986 A1 | 3/2002 |
| WO | 0230253 A1 | 4/2002 |
| WO | 03057355 A1 | 7/2003 |
| WO | 2006128221 A1 | 12/2006 |
| WO | 2009076585 A1 | 6/2009 |

OTHER PUBLICATIONS

International Application No. PCT/CN201001487, filed Sep. 1, 2011, published as WO2012113125A1 on Aug. 30, 2012, Title A Food Processing Device with an Externally Operated Adjustment Mechanism, Applicant: Whirlpool Corporation. Written Opinion of the International Search Authority with a mail date of Dec. 8, 2011.

International Application No. PCT/CN2011000311, filed Feb. 25, 2011, published as WO2012113106A1 on Aug. 30, 2012, Title "A Food Processing Device with an Externally Operated Adjustment Mechanism", Applicant: Whirlpool Corporation.

International Application No. PCT/CN2011000311, filed Feb. 25, 2011, published as WO2012113106A1 on Aug. 30, 2012, Title "A Food Processing Device with an Externally Operated Adjustment Mechanism", Applicant: Whirlpool Corporation. Written Opinion of the International Search Authority with a mail date of Nov. 17, 2011.

Wolfgang Puck Professional Series 12-cup Food Processor Use and Care, Jul. 3, 2007, GP. 1-23, W. P. Appliances, Inc. Model WPMFP20C, Rev 1.0, downloaded from: tscdist_foodprocmanual on Apr. 12, 2010.

Ellie; Home Cooking in Montana: Product Review . . . Cuisinart Elite 12 cup Food Processor Model FP-12DC; Mar. 30, 2012; 17 pages.

International Application No. PCT/CN2011000312, filed Feb. 25, 2011, published as WO2012113107A1 on Aug. 30, 2012, Title "A Food Processing Device with Control Buttons Mounted on Lid", Applicant: Whirlpool Corporation.

International Application No. PCT/CN2011000312, filed Feb. 25, 2011, published as WO2012113107A1 on Aug. 30, 2012, Title "A Food Processing Device with Control Buttons Mounted on Lid", Applicant: Whirlpool Corporation. Written Opinion of the International Search Authority with a mail date of Dec. 1, 2011.

European Patent Application No. 11859075.1, filed PCT, Feb. 25, 2011, national phase entry EP Aug. 23, 2013, Applicant: Whirlpool Corporation, European Search Report re: same, mail date Jul. 30, 2014.

European Patent Application No. 11859310.2, filed PCT, Sep. 1, 2011, national phase entry EP Aug. 23, 2013, Applicant: Whirlpool Corporation, European Search Report re: same, mail date Jun. 27, 2014.

European Patent Application No. 11859159.3, filed PCT, Feb. 25, 2011, national phase entry EP Aug. 23, 2013, Applicant: Whirlpool Corporation, European Search Report re: same, mail date Jun. 27, 2014.

* cited by examiner

FOOD PROCESSING DEVICE WITH LID MOUNTED CONTROLS

CROSS-REFERENCE TO RELATED U.S. PATENT APPLICATIONS

Cross-reference is made to co-pending U.S. Design patent application Ser. No. 29/386,174 entitled "Food Chopper," which was filed by Matt Czach, which is assigned to the same assignee as the present application and is hereby incorporated by reference.

TECHNICAL FIELD

The present disclosure relates generally to a domestic food processing device, and, more particularly, to a food processing device having controls mounted to the lid for operating the food processing device.

BACKGROUND

A food processing device is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool.

Food processing devices typically come equipped with a number of interchangeable cutting tools for slicing, shredding, or other food processing operations.

SUMMARY

According to one aspect of the disclosure, a food processing device is disclosed. The food processing device includes a base having a motor positioned therein, a removable bowl coupled to the base, and a cutting assembly. The removable bowl has a processing chamber defined therein. The cutting assembly is positioned in the processing chamber and is driven by the motor to cut food items placed in the processing chamber. The food processing device also includes a lid configured to be coupled to the bowl. The lid includes a first section having a feed tube that opens into the bowl and a pair of user-operated buttons operable to activate the motor. The food processing device has a locking mechanism configured to prevent activation of the motor when the lid is decoupled from the bowl.

In some embodiments, the first section and the pair of user-operated buttons may define a convex upper surface of the lid.

In some embodiments, the food processing device may further include a first switch positioned in the base that is operable to energize the motor at a first cutting speed when a first button of the pair of user-operated buttons is depressed. The food processing device may also include a second switch positioned in the base that is operable to energize the motor at a second cutting speed when a second button of the pair of user-operated buttons is depressed.

In some embodiments, the bowl may include a first arm that is positioned between the first button and the first switch when the lid is coupled to the bowl. The first arm may be moveable upwardly and downwardly relative to the base by the first button to operate the first switch. In some embodiments, the bowl may include a second arm that is positioned between the second button and the second switch when the lid is coupled to the bowl. The second arm may be upwardly and downwardly moveable relative to the base by the second button to operate the second switch.

Additionally, in some embodiments, the locking mechanism may include a plate moveably coupled to the bowl. The plate may be positionable between a first position in which the plate engages the first arm and the second arm such that movement of the first arm and the second arm relative to the base is prevented and a second position in which the plate is disengaged from the first arm and the second arm such that movement of the first arm and the second arm relative to the base is permitted.

In some embodiments, the locking mechanism may further include a spring positioned between the plate and a side wall of the bowl. The spring may bias the plate in the first position.

In some embodiments, the bowl may have a slot defined therein. The lid may include a flange that is positioned in the slot and is engaged with the plate when the lid is coupled to the bowl such that the plate is placed in the second position.

In some embodiments, the lid may further include a rocker arm configured to pivot in a first direction when the first button is depressed and pivot in a second direction when the second button is depressed.

According to another aspect, the food processing device includes a base having a motor positioned therein, a removable bowl coupled to the base, and a cutting assembly positioned in the bowl that is driven by the motor to cut food items placed in the bowl. The removable bowl includes a linkage assembly that is upwardly and downwardly moveable relative to the base to operate the motor. The food processing device also includes a lid configured to be coupled to the bowl. The lid includes a feed tube that opens into the bowl and a user-operated button configured to move the linkage assembly relative to the base to operate the motor. The food processing device includes a locking mechanism configured to prevent movement of the linkage assembly when the lid is decoupled from the bowl.

In some embodiments, the locking mechanism may include a plate. The plate may be positionable between a first position in which the plate engages the linkage assembly such that movement of the linkage assembly relative to the base is prevented, and a second position in which the plate is disengaged from the linkage assembly such that movement of the linkage assembly relative to the base is permitted.

Additionally, in some embodiments, the locking mechanism may further include a spring positioned between the plate and a side wall of the bowl. The spring may bias the plate in the first position.

In some embodiments, the bowl may have a slot defined therein, and the lid may include a flange that is received in the slot and is engaged with the plate when the lid is coupled to the bowl such that the plate is placed in the second position.

In some embodiments, the food processing device may further include a switch that is positioned in the base below the linkage assembly and is operable to energize the motor. When the user-operated button is depressed, the linkage assembly may be moved downward to operate the switch and thereby energize the motor.

In some embodiments, the linkage assembly may include an arm that is positioned between the user-operated button and the switch when the lid is coupled to the removable bowl. The arm may be positionable a first position in which the arm operates the switch to energize the motor, and a second position in which the motor is de-energized. The linkage assembly may also include a spring having a first spring end coupled to the arm and a second spring end coupled to an inner wall of the removable bowl. The spring may be configured to bias the arm in the second position.

In some embodiments, the removable bowl may include a first side wall that defines a processing chamber having the cutting assembly positioned therein. The removable bowl may also include a second side wall that defines a rear compartment positioned behind the processing chamber. The rear compartment may have the arm positioned therein.

Additionally, in some embodiments, the lid may have a convex upper surface, and the user-operated button may define a section of the convex upper surface.

According to another aspect, the food processing device includes a base having a motor and a pair of switches positioned therein. Each switch is operable to energize the motor. The food processing device also includes a removable bowl coupled to the base having a pair of arms that are upwardly and downwardly moveable relative to the base to operate the pair of switches, and a cutting assembly positioned in the bowl and driven by the motor to cut food items placed in the bowl. The food processing device further includes a lid configured to be coupled to the bowl. The lid has a feed tube that opens into the bowl and a pair of user-operated buttons configured to move the pair of arms relative to the base. When a first user-operated button is depressed, a first arm is moved downward to operate a first switch and thereby energize the motor at a first cutting speed. When a second user-operated button is depressed, a second arm is moved downward to operate a second switch and thereby energize the motor at a second cutting speed.

In some embodiments, the food processing device may further include a first spring having a first spring end coupled to the first arm and a second spring end coupled to an inner wall of the removable bowl. In some embodiments, the first arm may be positioned between the first user-operated button and the first switch when the lid is coupled to the removable bowl. The first arm may be positionable between a first position in which the first arm operates the first switch to energize the motor, and a second position in which the motor is de-energized. The first spring may be configured to bias the first arm in the second position.

In some embodiments, the removable bowl may include a first side wall that defines a processing chamber having the cutting assembly positioned therein, and a second side wall that defines a rear compartment positioned behind the processing chamber. The rear compartment may have the pair of arms positioned therein.

In some embodiments, the lid may have a convex upper surface, and the pair of user-operated buttons may define a section of the convex upper surface.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
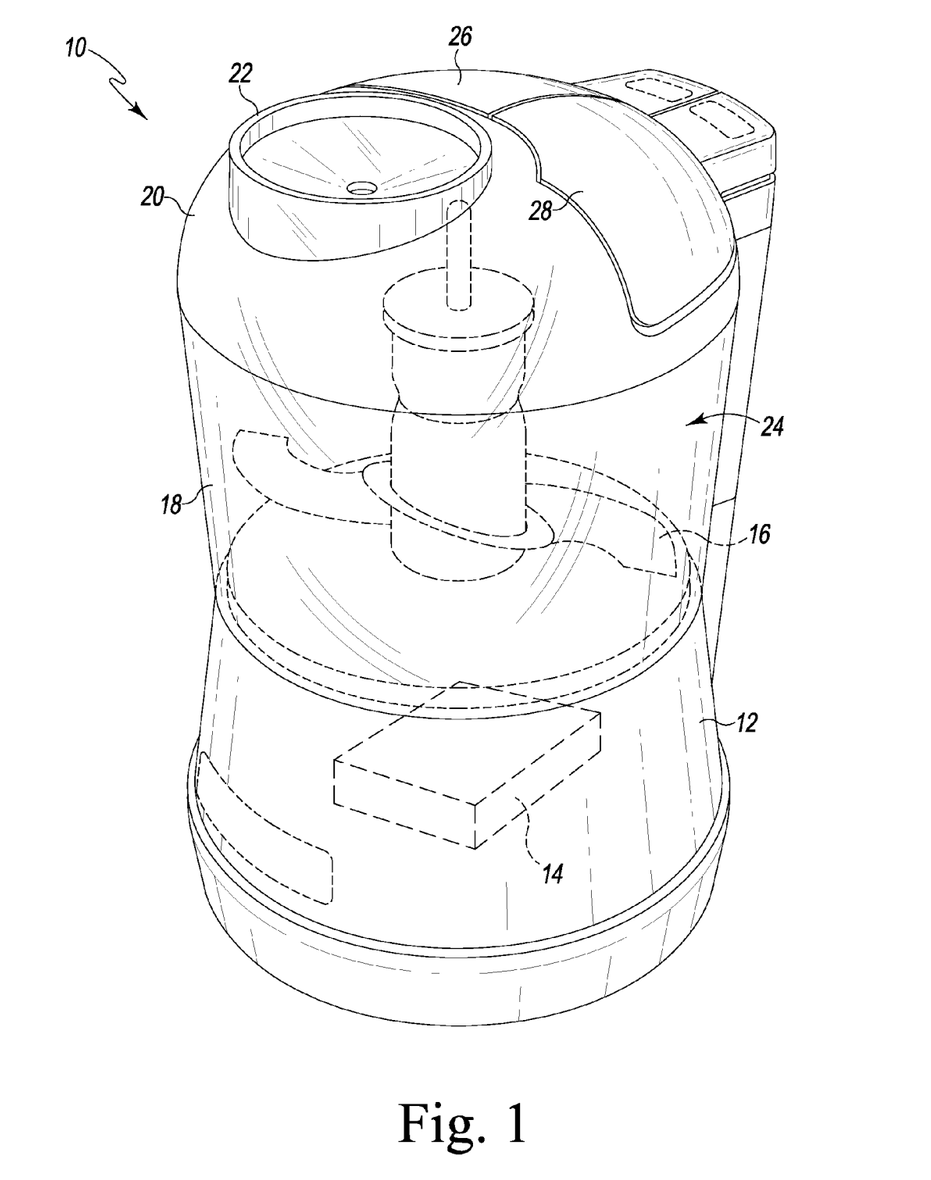
FIG. 1 is a perspective view of one embodiment of a food processing device with lid-mounted control buttons.

Referring to FIG. 1, a food processing device or food chopper 10 is shown. The food chopper 10 has a base 12 that houses a motor 14. As described in greater detail below, the motor 14 drives a cutting assembly 16 to cut food items such as cheeses, meats, fruits, and vegetables when the motor 14 is energized. The cutting assembly 16 is illustratively embodied as a multipurpose blade assembly including a pair of cutting blades. It will be appreciated that in other embodiments the cutting assembly 16 may be a shedding disk, adjustable slicing disk, or other cutting attachment configured to cut food items.

The food chopper 10 also includes a removable receptacle or bowl 18 secured to the base 12, and a removable lid 20 secured to the bowl 18. It should be appreciated that one or more locking mechanisms may be used to lock the bowl 18 to the base 12 and the lid 20 to the bowl 18. The lid 20 has a feed tube 22 formed thereon through which food items such as fruits and vegetables are inserted into the bowl 18 to be processed by the food chopper 10. Collectively, the lid 20 and the bowl 18 define a processing chamber 24 where food items are processed by the cutting assembly 16.

The lid 20 includes a pair of control buttons 26, 28 that are operable to control the operation of the motor 14. As will be described in greater detail below, the user alternately operates the control buttons 26, 28 to energize the motor 14 at two different cutting speeds. It will be appreciated that in other embodiments the lid 20 may include only a single control button operable to energize the motor 14 at a single cutting speed or additional control buttons operable to energize the motor 14 at other cutting speeds.

Figure 2:
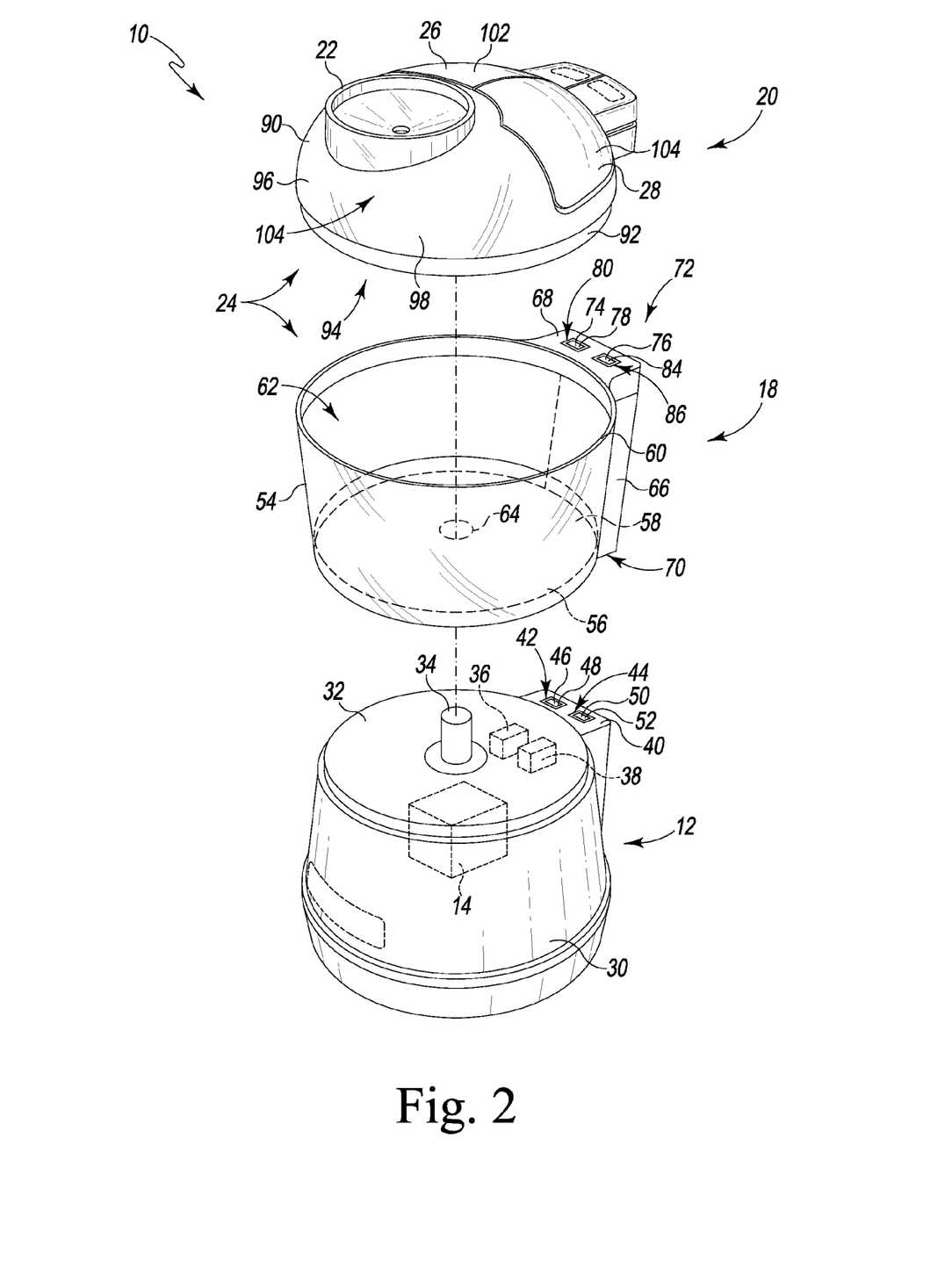
FIG. 2 is an exploded perspective view of the food processing device of FIG. 1.

Referring now to FIG. 2, the base 12 of the food chopper 10 includes a housing 30 having a mounting surface 32 configured to support the bowl 18. The motor 14 has an output shaft 34 that extends upwardly through the mounting surface 32, and the output shaft 34 is coupled to the cutting assembly 16 when the food chopper 10 is assembled. The motor 14 and a pair of mechanically-operated relays or relay switches 36, 38 are positioned within the housing 30. The switches 36, 38 are electrically coupled to the motor 14 and are positioned between the motor 14 and an electrical power supply (not shown). The switches 36, 38 may be selectively opened and closed to regulate the electrical power supplied to the motor 14.

For example, when the switch 36 is closed, the motor 14 is energized with a first quantity of electrical power supplied from the electrical power supply. When energized with the first quantity of power, the motor 14 rotates the cutting assembly 16 via the output shaft 34 at a first cutting speed.

Alternately, when the switch 38 is closed, the motor 14 is energized with a second quantity of electrical power supplied from the electrical power supply. When energized with the second quantity of power, the motor 14 rotates the cutting assembly 16 via the output shaft 34 at a second cutting speed. When the switches 36, 38 are both open, the motor 14 is disconnected from the electrical power supply.

The housing 30 also includes an interface surface 40 extending outwardly from the mounting surface 32 on the back side of the base 12. The interface surface 40 has a pair of openings 42, 44 defined therein. The switch 36 has a lever 46 that is operable to selectively open and close the switch 36 and thereby connect and disconnect the motor 14 with the electrical power supply. The lever 46 has an upper end 48 positioned in opening 42 of the interface surface 40. The switch 38 also has a lever 50, which is operable to selectively open and close the switch 36 and thereby connect and disconnect the motor 14 with the electrical power supply. The lever 50 has an upper end 52 positioned in the opening 44 of the interface surface 40.

As described above, the bowl 18 of the food chopper 10 is configured to be coupled to the base 12. The bowl 18 includes an outer shell 54 having a bottom wall 56 and a side wall 58 extending upwardly from the bottom wall 56. The side wall 58 has an upper rim 60, and the rim 60 and the walls 56, 58 define a lower cavity 62 of the processing chamber 24 where food items are processed by the cutting assembly 16. The bottom wall 56 has an opening 64 defined therein that is sized to receive the output shaft 34 of the motor 14 when the bowl 18 is attached to the base 12.

The bowl 18 also includes a rear housing 66 connected to the outer shell 54. The rear housing 66 has an upper interface surface 68 that faces the lid 20 and a lower interface surface 70 that faces the base 12. When the bowl 18 is positioned on the mounting surface 32 of the base 12, the lower interface surface 70 of the bowl 18 is placed in contact with the interface surface 40 of the base 12.

The rear housing 66 of the bowl 18 has a linkage assembly 72 positioned therein configured to couple the control buttons 26, 28 with the switches 36, 38, respectively. The linkage assembly 72 includes a pair of link 74, 76 that are moveable coupled to the rear housing 66 and extend between the upper interface surface 68 and the lower interface surface 70 of the rear housing 66. The link 74 has an upper end 78, which is positioned in an opening 80 defined in the upper interface surface 68, and a lower end 82 (see FIG. 3), which is positioned in an opening defined in the lower interface surface 70. When the bowl 18 is positioned on the base 12, the lower end 82 of the link 74 is positioned over the upper end 48 of the lever 46 of the switch 36. When the link 74 is moved downward, the lower end 82 of the link 74 is advanced out of the rear housing 66 and moved into contact with the upper end 48 of the lever 46, thereby actuating the lever 46 and closing the switch 36.

The link 76 of the linkage assembly 72 similarly has an upper end 84, which is positioned in an opening 86 defined in the upper interface surface 68, and a lower end 88 (see FIG. 3), which is positioned in an opening defined in the lower interface surface 70. When the bowl 18 is positioned on the base 12, the lower end 88 of the link 76 is positioned over the upper end 52 of the lever 50 of the switch 38. When the link 76 is moved downward, the lower end 88 of the link 76 is advanced out of the rear housing 66 and moved into contact with the upper end 52 of the lever 50, thereby actuating the lever 50 and closing the switch 38.

As described above, the bowl 18 of the food chopper 10 has the lid 20 removably secured thereto. The lid 20 includes an outer shell 90 and the control buttons 26, 28 that are pivotally coupled to the outer shell 90. The outer shell 90 has a lower rim 92 that defines a dome-shaped cavity 94 within the outer shell 90. When the lid 20 is secured to the bowl 18, the dome-shaped cavity 94 and the lower cavity 62 of the bowl 18 define the processing chamber 24. The shells 54, 90 of the bowl 18 and the lid 20 are generally made of a transparent or translucent plastic material so that the contents of the processing chamber 24 can be viewed by a user without removing the lid 20 from the bowl 18.

The shell 90 of the lid 20 includes a front section 96 having the feed tube 22 formed thereon. As shown in FIG. 2, the front section 96 has a curved surface 98. The control buttons 26, 28 also have curved surfaces 100, 102 that are substantially flush with the surface 98 of the front section 96. The surfaces 98, 100, 102 define a convex upper surface 104 of the lid 20.

Figure 3:
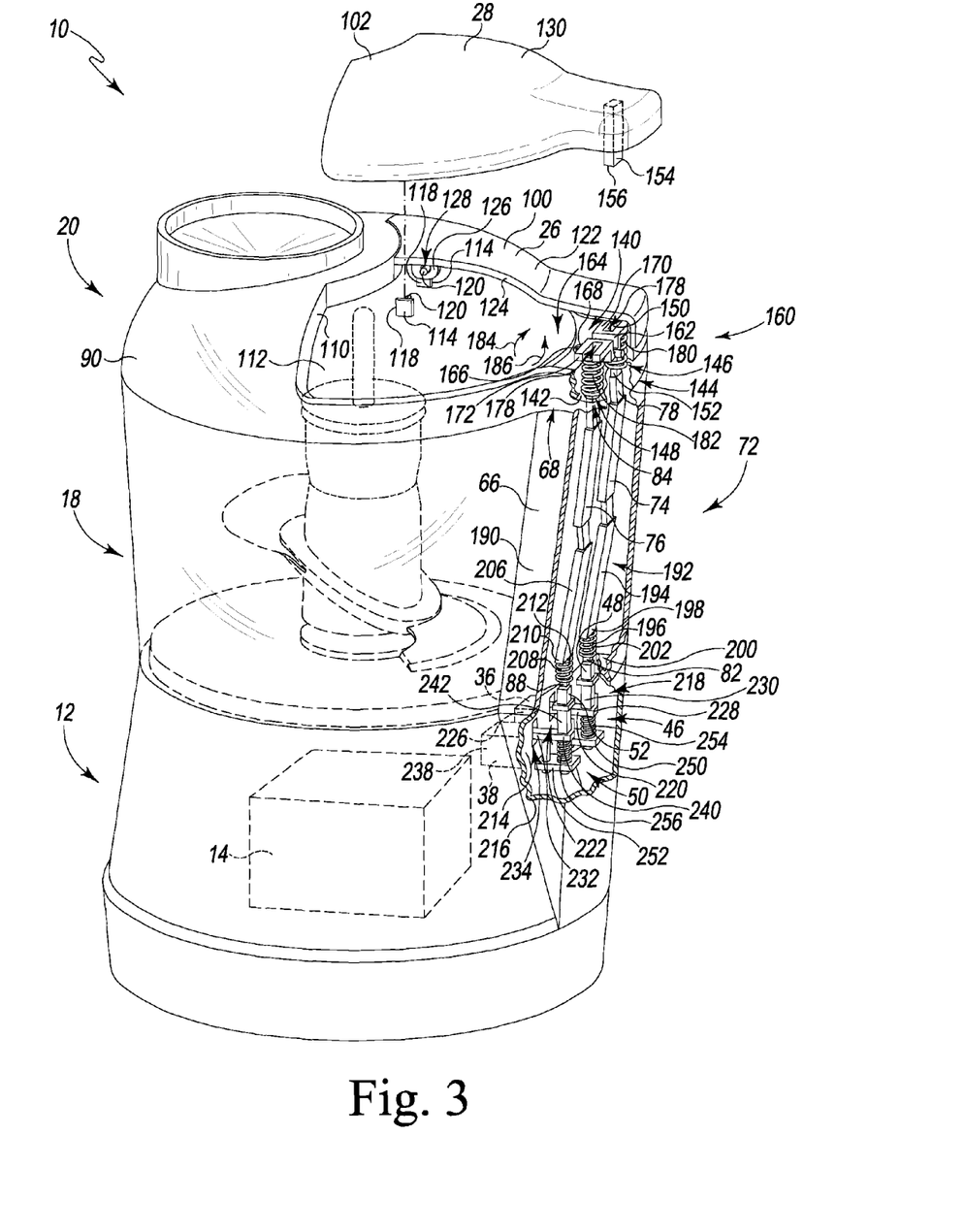
FIG. 3 is a partial cross-sectional rear perspective view of the food processing device of FIG. 1 showing a linkage assembly positioned between the control buttons and the base of the food processing device.

Referring now to FIG. 3, the outer shell 90 of the lid 20 has an inner wall 110 that extends downwardly from the upper surface 104 of the front section 96 to a lower surface 112. The outer shell 90 includes a pair of mounting brackets 114 that pivotally couple the control buttons 26, 28 to the lid 20. Each mounting bracket 114 has a base 118 extending upwardly from the lower surface 112 of the shell 90 and a mounting pin 120 extending outwardly from the base 118.

The control button 26 has a body 122 that includes the surface 100 and a lower surface 124 positioned opposite the surface 100. The control button 26 also includes a flange 126 extending downwardly from the lower surface 124. The flange 126 has a hole 128 defined therein to receive the pin 120 of one of the mounting brackets 114 and thereby pivotally couple the button 26 to the shell 90. The control button 28 has a body 130 that includes the surface 102 and a lower surface (not shown) positioned opposite the surface 102. Like the control button 28, the control button 26 also includes a flange (not shown) that has a hole defined therein that receives the pin 120 of the other mounting bracket 114 to pivotally couple the button 28 to the shell 90.

The outer shell 90 of the lid 20 also has a rear bracket 140 positioned behind the rim 92. The rear bracket 140 includes an upper surface 142 and an interface surface 144 positioned opposite the upper surface 142. The rear bracket 140 has a pair of openings 146, 148 defined therein that extend between the surfaces 142, 144. When the lid 20 is secured to the bowl 18, the interface surface 144 is placed in contact with the upper interface surface 68 of the bowl 18. The openings 146, 148 of the rear bracket 140 are substantially aligned with the openings 80, 86 defined in the upper interface surface 68 of the bowl 18.

As shown in FIG. 3, the control button 26 includes a control rod 150 extending downwardly from the lower surface 124 of the body 122. The control rod 150 has a lower end 152 that is positioned in the opening 146 of the rear bracket 140. In that way, when the lid 20 is secured to the bowl 18, the lower end 152 of the control rod 150 is positioned over the upper end 78 of the link 74 of the linkage assembly 72. When the button 26 is pressed by a user, the lower end 152 of the control rod 150 advances out of the opening 146 and acts on the upper end 78 of the link 74, thereby causing the link 74 to move downward relative to the base 12.

The control button 28 also includes a control rod 154 that extends downwardly from the lower surface of the body 130. The control rod 154 has a lower end 156 that is positioned in the opening 148 of the rear bracket 140 such that when the lid 20 is secured to the bowl 18, the lower end 156 of the control rod 154 is positioned over the upper end 84 of the link 76 of the linkage assembly 72. When the button 28 is pressed by a user, the lower end 156 of the control rod 154 is advances out of the opening 148 and acts on the upper end 84 of the link 76, thereby causing the link 76 to move downward relative to the base 12.

The lid 20 also includes a rocker plate 160 that is configured to prevent the user from operating both control buttons 26, 28 at the same time. The rocker plate 160 has a body 162 that is pivotally coupled to the rear bracket 140 via a joint 164. The joint 164 includes a pair of grooves 166 defined in the rear bracket 140 and a pair of cylindrical pins 168 extending outwardly from the body 162 of the rocker plate 160. The rocker plate 160 also has a pair of arms 170, 172 extending from an upper end 174 of the body 162. The arms 170, 172 have slots 176, 178, respectively, defined therethrough.

A biasing element, illustratively embodied as a spring 180, is positioned between the arm 172 and the rear bracket 140, and another biasing element, illustratively embodied as a spring 182, is positioned between the arm 170 and the rear bracket 140. The control rod 150 of the button 26 is positioned in the slot 176 of the arm 170, and the spring 180 extends over the control rod 150. The control rod 154 of the button 28 is positioned in the slot 176 of the arm 172, and the spring 182 extends over the control rod 154.

As shown in FIG. 3, the rear housing 66 of the bowl 18 has a side wall 190 that defines a compartment 192. The links 74, 76 of the linkage assembly 72 are positioned in the compartment 192. The link 74 includes an upper arm 194 and a lower arm 196. The upper arm 194 extends downwardly from the upper end 78 of the link 74 and has a bottom end 198 positioned above a bottom wall 200 of the rear housing 66. The lower arm 196 extends downwardly from the bottom end 198 of the upper arm 194 to the lower end 82 of the link 74. A biasing element, illustratively embodied as a spring 202, is positioned between the bottom end 198 of the upper arm 194 and the bottom wall 200 of the rear housing 66. As described above, when the button 26 is pressed by a user, the lower end 152 of the control rod 150 of the button 26 is advanced out of the opening 146. That downward movement of the control rod 150 causes downward movement of the link 74 such that the lower end 82 of the link 74 is advanced out of the rear housing 66.

The link 76 is positioned parallel to the link 74 in the compartment 192. Like the link 74, the link 76 includes an upper arm 206 and a lower arm 208. The upper arm 206 extends downwardly from the upper end 84 of the link 76 and has a bottom end 210 positioned above the bottom wall 200 of the rear housing 66. The lower arm 208 extends downwardly from the bottom end 210 of the upper arm 206 to the lower end 88 of the link 76. A biasing element, illustratively embodied as a spring 212, is positioned between the bottom end 210 of the upper arm 206 and the bottom wall 200 of the rear housing 66. As described above, when the button 28 is pressed by a user, the lower end 156 of the control rod 154 of the button 28 is advanced out of the opening 148. That downward movement of the control rod 154 causes downward movement of the link 76 such that the lower end 88 of the link 76 is advanced out of the rear housing 66.

The housing 30 of the base 12 includes an inner wall 214 and an outer wall 216 that define a compartment 218 below the interface surface 40. The lever 46 of the switch 36 includes a lever body 220 extending outwardly through an opening 222 defined in the inner wall 214. The lever body 220 includes an end (not shown) that is pivotally coupled to the main body 226 of the switch 36 and an end 228 that is positioned in the compartment 218.

The lever 46 also includes a lever arm 230 extending upwardly from the end 228 of the lever body 220. The lever arm 230 includes the upper end 48 of the lever 46, which, as described above, is positioned in the opening 42 of the interface surface 40. In that way, the lever arm 230 is positioned below the lower end 82 of the link 74 when the bowl 18 is secured to the base 12. When the lower end 82 of the link 74 is advanced out of the rear housing 66, the lever arm 230 is moved downward and the end 228 of the lever body 220 is moved to a lowered position in which the switch 36 is closed, thereby connecting the motor 14 to the external power supply.

The lever 50 of the switch 38 includes a lever body 232 extending outwardly through an opening 234 defined in the inner wall 214. The lever body 232 includes an end that is pivotally coupled to the main body 238 of the switch 38 and an end 240 that is positioned in the compartment 218. The lever 50 also includes a lever arm 242 extending upwardly from the end 240 of the lever body 232. The lever arm 242 includes the upper end 52 of the lever 50, which, as described above, is positioned in the opening 44 of the interface surface 40. In that way, the lever arm 242 is positioned below the lower end 88 of the link 76 when the bowl 18 is secured to the base 12. When the lower end 88 of the link 76 is advanced out of the rear housing 66, the lever arm 242 is moved downward and the end 240 of the lever body 232 is moved to a lowered position in which the switch 38 is closed, thereby connecting the motor 14 to the external power supply.

The inner wall 214 of the base 12 has a pair of brackets 250, 252 secured thereto below the levers 46, 50. A biasing element, illustratively embodied as a spring 254, is positioned between the end 228 of the lever body 220 and the bracket 250. The spring 254 biases the end 228 of the lever body 220 in a raised position such that the switch 36 is open and the motor 14 is disconnected from the electrical power supply. Another biasing element illustratively embodied as a spring 256, is positioned between the end 240 of the lever body 232 and the bracket 252. The spring 256 biases the end 240 of the lever body 220 in a raised position such that the switch 38 is open and the motor 14 is disconnected from the electrical power supply.

When the food chopper 10 is assembled, the user may alternately operate the control buttons 26, 28 to control the operation of the motor 14. For example, when the user operates the button 26, the user presses on the surface 100 of the button 26, and control button 26 pivots about the mounting pin 120 to move from a raised position to a lowered position. The control rod 150 of the button 26 advances downward, and the lower surface 124 of the body 122 acts on the arm 170 to cause the rocker plate 160 to pivot about the joint 164 in the direction indicated by arrow 184. As the arm 170 of the rocker plate 160 moves downward, the spring 180 is compressed between the arm 170 and the rear bracket 140. At the same time, the arm 172 of the rocker plate 160 moves upward into contact with the lower surface of the body 130 of the button 28, thereby preventing the user from depressing the button 28 while the button 26 is depressed. In that way, the rocker plate 160 prevents a user from simultaneously operating both buttons 26, 28.

As described above, downward movement of the control rod 150 causes downward movement of the link 74, thereby compressing the spring 202 between the bottom end 198 of the upper arm 194 and the bottom wall 200 of the rear housing 66 and advancing the lower arm 196 of the link 74 out of the rear housing 66. When the lower end 82 of the link 74 is advanced out of the rear housing 66, the lever arm 230 is moved downward and the end 228 of the lever body 220 is moved to the lowered position, thereby closing the switch 36.

With the switch 36 closed, the motor 14 is connected with the electrical power supply and the motor 14 is energized with the first quantity of power. As described above, when the motor 14 is energized with the first quantity of power, the motor 14 drives the cutting assembly 16 at the first cutting speed. The motor 14 remains energized with power as long as the user continues to press and hold the control button 26 in the lowered position.

When the user releases the button 26, the spring 180 urges the arm 170 of the rocker plate 160 to advance upward, thereby causing the rocker plate 160 pivot about joint 164 in the direction indicated by arrow 186. As the arm 170 advances upward, the arm 170 acts on the lower surface 124 of the body 122 to return the button 26 to the raised position. As the rocker plate 160 pivots, the arm 172 of the rocker plate 160 moves away from the lower surface of the body 130 of the button 28 such that the user may operate the button 28.

Simultaneously, the spring 202 urges the link 74 of the linkage assembly 72 upward within the rear housing 66, and the spring 254 positioned between the end 228 of the lever body 220 and the bracket 250 urges the end 228 of the lever body 220 upward, thereby opening the switch 36. With the switch 36 open, the motor 14 is disconnected from the electrical power supply and therefore de-energized. It should be appreciated the control button 28 may be operated in a similar manner to selectively energize or de-energize the motor 14 and thereby drive the cutting assembly 16 at the second cutting speed.

Figure 4:
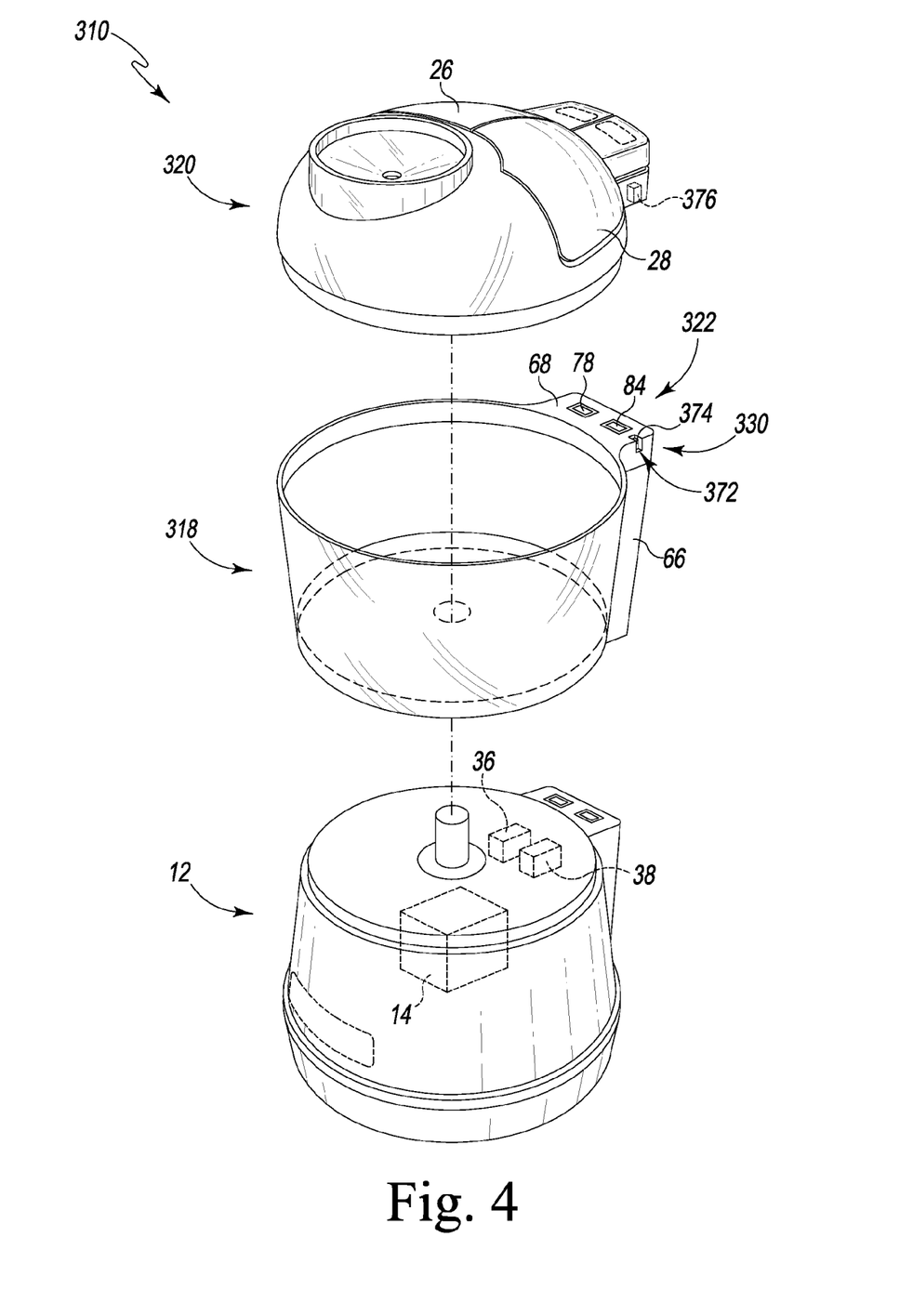
FIG. 4 is an exploded perspective view of another embodiment of a food processing device.
Figure 5A:
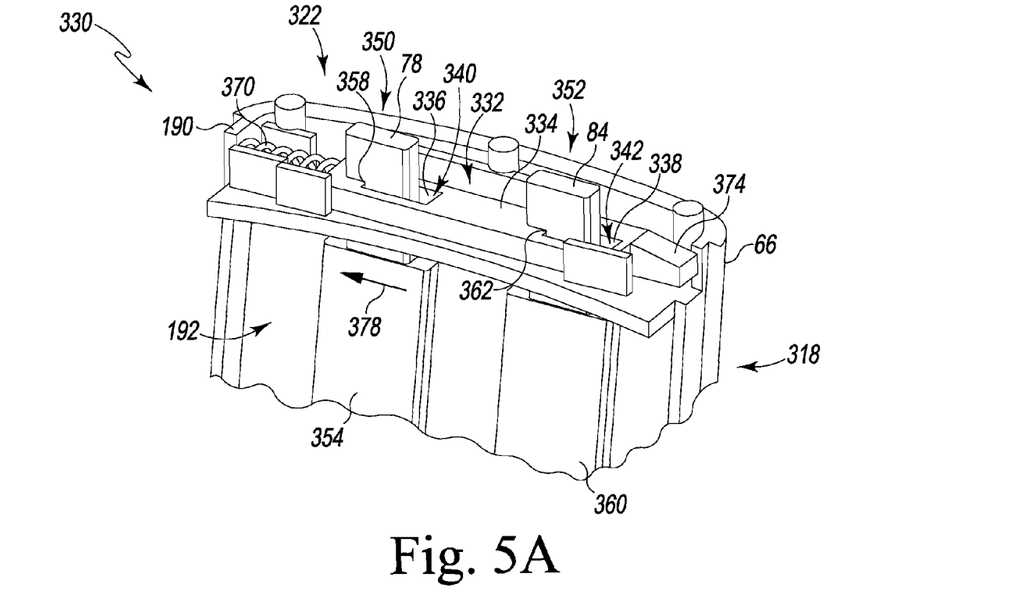
FIG. 5A is a partial cross-sectional perspective view of the food processing device of FIG. 4 showing a locking mechanism in a locked position.
Figure 5B:
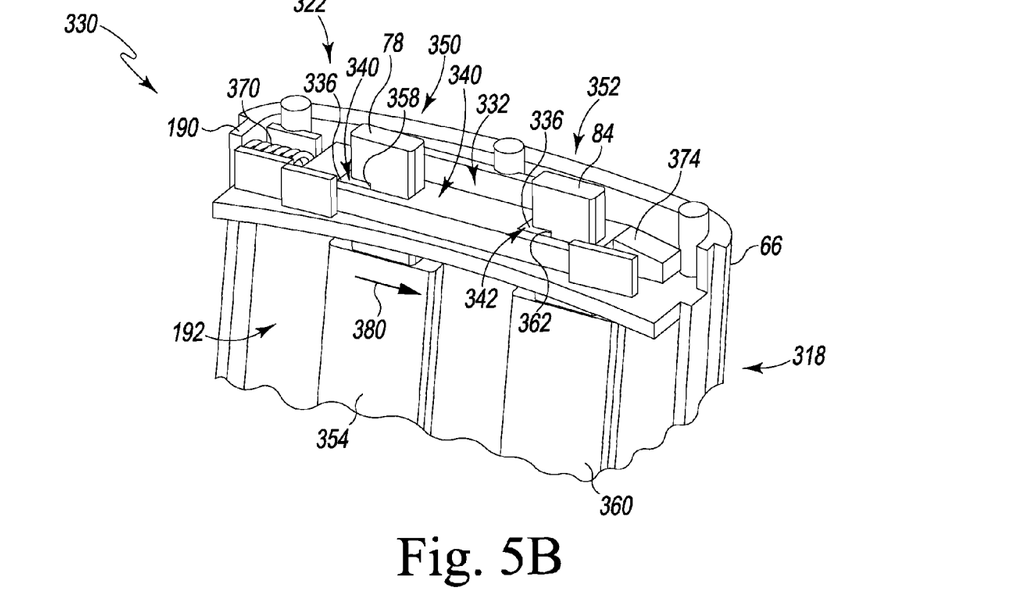
FIG. 5B is a view similar to FIG. 4A showing the locking mechanism of the food processing device of FIG. 4 in an unlocked position.

Referring now to FIGS. 4 and 5, another embodiment of a food chopper (hereinafter referenced as a food chopper 310) is shown. Some features of the embodiment illustrated in FIGS. 4 and 5 are substantially similar to those discussed above in reference to the embodiment of FIGS. 1-3. Such features are designated in FIGS. 4 and 5 with the same reference numbers as those used in FIGS. 1-3.

Referring now to FIG. 4, the food chopper 310, like the food chopper 10, has a base 12 that houses a motor 14 operable to drive a cutting assembly (not shown) to cut food items. The food chopper 310 also includes a removable receptacle or bowl 318 secured to the base 12, and a removable lid 320 secured to the bowl 318. The lid 320 includes a pair of control buttons 26, 28 that are operable to control the operation of the motor 14. Similar to the embodiment of FIGS. 1-3, the user alternately operates the control buttons 26, 28 to cause a linkage assembly 322 positioned in a rear housing 66 of the bowl 318 to actuate a pair of switches 36, 38 to energize the motor 14 at different cutting speeds.

The food chopper 310 also includes a locking mechanism 330 configured to prevent the motor 14 from being energized when the lid 320 is not secured to the bowl 318. As shown in FIG. 5A, the locking mechanism 330 includes a sliding plate 332 that is positioned in a compartment 192 defined in the rear housing 66 of the bowl 318. The sliding plate 332 has a body 334 that includes an inner wall 336 and an inner wall 338. The inner wall 336 defines a slot 340 through the body 334, and the inner wall 338 defines another slot 342 through the body 334.

As shown in FIG. 5A, the linkage assembly 322 includes a pair of links 350, 352 that are similar to the links 74, 76 described above in regard to FIGS. 1-3. The link 350 includes an upper arm 354 that extends downwardly from an upper end 78 of the link 350. The upper arm 354 is positioned in the slot 340 of the sliding plate 332 and has a notch 358 defined in one side thereof configured to engage with the inner wall 336 of the sliding plate 332. The link 352 also includes an upper arm 360 that extending downwardly from an upper end 84 of the link 352. The upper arm 360 is positioned in the slot 342 of the sliding plate 332 and has a notch 362 defined in one side thereof configured to engage with the inner wall 338 of the sliding plate 332. The engagement of the notches 358, 362 with the inner walls 336, 338 of the sliding plate 332 locks the links 350, 352 of the linkage assembly 322 into position, thereby preventing the linkage assembly 322 from moving relative to the base 12 to actuate the switches 36, 38 and energize the motor 14. A biasing element, illustratively embodied as a spring 370, is positioned between the body 334 of the sliding plate 332 and a sidewall 190 of the rear housing 66.

As shown in FIG. 4, the rear housing 66 has an interface surface 68. A slot 372 is defined in the interface surface 68, and a tip 374 of the sliding plate 332 extends into the slot 372. In that way, the sliding plate 332 is accessible from outside of the compartment 392. The lid 320 of the food chopper 310 includes a flange 376 that is sized to be received in the slot 372.

When the lid 320 is attached to the bowl 318, the flange 376 engages the tip 374 of the sliding plate 332. The bias of spring 370 is overcome, and the sliding plate 332 is advanced in the direction indicated by arrow 378 in FIG. 5A, thereby withdrawing the inner walls 336, 338 of the sliding plate 332 from the notches 358, 368 of the links 350, 352 as the sliding plate 332 moves from the locked position shown in FIG. 5A to the unlocked position shown in FIG. 5B. With the inner walls 336, 338 spaced apart from the notches 358, 368 as shown in FIG. 5B, the links 350, 352 are free to move upward or downward relative to the base 12. In that way, the user may alternately operate the control buttons 26, 28 to cause links 350, 352 to actuate the switches 36, 38 to energize the motor 14 at different cutting speeds.

When the lid 320 is removed from the bowl 318, the spring 370 urges the sliding plate 332 to move in the direction indicated by arrow 380 in FIG. 5B. The inner walls 336, 338 of the sliding plate 332 move back into engagement with the notches 358, 368, thereby preventing upward or downward movement of the links 350, 352.

It should be appreciated that in other embodiments the food processing device may include a locking mechanism in the base configured to prevent the motor from being energized with the bowl is not coupled to the base. Additionally, the food processing device may include other locking mechanisms that prevent the motor from being energized unless the food processing device is fully assembled.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A food processing device comprising
a base having:

a motor positioned therein,
a first switch positioned in the base, the first switch being operable to energize the motor at a first cutting speed when a first button of a pair of user-operated buttons is depressed, and
a second switch positioned in the base, the second switch being operable to energize the motor at a second cutting speed when a second button of the pair of user-operated buttons is depressed,
a removable bowl coupled to the base, the removable bowl having:
a processing chamber defined therein,
a first arm positioned between the first button and the first switch when a lid is coupled to the bowl, the first arm being moveable upwardly and downwardly relative to the base by the first button to operate the first switch, and
a second arm positioned between the second button and the second switch when the lid is coupled to the bowl, the second arm being upwardly and downwardly moveable relative to the base by the second button to operate the second switch,
a cutting assembly positioned in the processing chamber and driven by the motor to cut food items placed in the processing chamber,
the lid configured to be coupled to the bowl, the lid including a first section having a feed tube that opens into the bowl and the pair of user-operated buttons operable to activate the motor, and
a locking mechanism configured to prevent activation of the motor when the lid is decoupled from the bowl wherein the locking mechanism comprises a plate moveably coupled to the bowl, the plate being positionable between (i) a first position in which the plate engages the first arm and the second arm such that movement of the first arm and the second arm relative to the base is prevented, and (ii) a second position in which the plate is disengaged from the first arm and the second arm such that movement of the first arm and the second arm relative to the base is permitted.

2. The food processing device of claim 1, wherein the first section and the pair of user-operated buttons define a convex upper surface of the lid.

3. The food processing device of claim 1, wherein the locking mechanism further comprises a spring positioned between the plate and a side wall of the bowl, the spring biasing the plate in the first position.

4. The food processing device of claim 1, wherein:
the bowl has a slot defined therein, and
the lid includes a flange that is positioned in the slot and is engaged with the plate when the lid is coupled to the bowl such that the plate is placed in the second position.

5. The food processing device of claim 1, wherein the lid further includes a rocker arm configured to (i) pivot in a first direction when the first button is depressed and (ii) pivot in a second direction when the second button is depressed.

6. A food processing device comprising
a base having a motor positioned therein,
a removable bowl coupled to the base, the removable bowl including a linkage assembly that is upwardly and downwardly moveable relative to the base to operate the motor,
a cutting assembly positioned in the bowl and driven by the motor to cut food items placed in the bowl,
a lid configured to be coupled to the bowl, the lid including a feed tube that opens into the bowl and a user-operated button configured to move the linkage assembly relative to the base to operate the motor, and
a locking mechanism configured to prevent movement of the linkage assembly when the lid is decoupled from the bowl wherein the locking mechanism comprises a plate positionable between (i) a first position in which the plate engages the linkage assembly such that movement of the linkage assembly relative to the base is prevented, and (ii) a second position in which the plate is disengaged from the linkage assembly such that movement of the linkage assembly relative to the base is permitted.

7. The food processing device of claim 6, wherein the locking mechanism further comprises a spring positioned between the plate and a side wall of the bowl, the spring biasing the plate in the first position.

8. The food processing device of claim 6, wherein:
the bowl has a slot defined therein, and
the lid includes a flange that is received in the slot and is engaged with the plate when the lid is coupled to the bowl such that the plate is placed in the second position.

9. The food processing device of claim 6, further comprising:
a switch positioned in the base below the linkage assembly, the switch being operable to energize the motor,
wherein when the user-operated button is depressed, the linkage assembly is moved downward to operate the switch and thereby energize the motor.

10. The food processing device of claim 9, wherein the linkage assembly includes:
an arm positioned between the user-operated button and the switch when the lid is coupled to the removable bowl, the arm being positionable between (i) a first position in which the arm operates the switch to energize the motor, and (ii) a second position in which the motor is de-energized, and
a spring having a first spring end coupled to the arm and a second spring end coupled to an inner wall of the removable bowl, the spring being configured to bias the arm in the second position.

11. The food processing device of claim 10, wherein the removable bowl includes a first side wall that defines a processing chamber having the cutting assembly positioned therein, and
a second side wall that defines a rear compartment positioned behind the processing chamber, the rear compartment having the arm positioned therein.

12. The food processing device of claim 6, wherein the lid has a convex upper surface and the user-operated button defines a section of the convex upper surface.

* * * * *